Inventors,
Fredrick Trostler,
and Thomas Andrews
by Sommers & Young
Attorneys

May 23, 1944.  F. TROSTLER ET AL  2,349,528
SEPARATION OF SOLID MATERIALS OF DIFFERENT SPECIFIC GRAVITIES
Filed Dec. 26, 1940  4 Sheets-Sheet 4

Patented May 23, 1944

2,349,528

UNITED STATES PATENT OFFICE 2,349,528

SEPARATION OF SOLID MATERIALS OF DIFFERENT SPECIFIC GRAVITIES

Fredrick Trostler, London, and Thomas Andrews, Barking, England

Application December 26, 1940, Serial No. 371,839
In Great Britain November 7, 1940

19 Claims. (Cl. 209—173)

The invention relates to improved processes and apparatus for the heavy medium separation, or, as it is also termed, sink-and-float, or differential density, separation, of minerals or other divided solid materials of different specific gravities, in media composed of heavy liquids, solutions or substantially stable suspensions having a specific gravity intermediate between those of the lighter and heavier components of the minerals or the like.

A particular object of the invention is the provision of improved processes and apparatus for the more efficient recovery of economic values from "marginal density" material; that is to say, the sink-and-float method is adapted to the separation of ores and other materials which contain, on crushing to suitable sizes, a considerable proportion of particles the specific gravity of which is only slightly above that of the pure gangue constituents or other "float" materials. Other objects of the invention consist in the provision of improved processes and process steps, forms of apparatus and combinations of elements, adapted for efficient and controlled sink-and-float separation, as will more fully hereinafter appear.

The invention provides certain adjustments and controls which may and, for the most effective operation should, to a considerable extent depend upon characteristics of the particular ore or material treated. These characteristics, such as the slowest falling velocities of marginal density particles of the particular material should, therefore, for best operation, be determined as a preliminary to the actual operation of separation.

The adjustments and controls mentioned have to do, chiefly, with the rates of discharge of heavy medium from the top and from the bottom of the body of heavy medium in the separator ("boom" and "weir" discharge), and with the depth of the separating zone at the top of the body of medium. The invention envisages a separating zone, generally much shallower than is usual, at the top of the separator, so arranged that slow-moving marginal density particles will fall therethrough with the minimum of hindrance, and that the medium will here be undisturbed as far as possible. These particles, which otherwise would tend to "teeter" and to crowd and mat together at or adjacent to the lower surface of the separating zone are, at this level, given a downward impetus and conveyed downwardly by a carefully controlled current. The depth of the separating zone is adjustable by varying the level, a short distance below the surface of the body of medium, at which medium is admitted thereto, and this adjustment is made to depend upon the velocities of the slowest-falling marginal density particles of the material being treated.

Medium, and float particles (and moisture from the ore feed, if present), are continuously removed over the boom, opposite to the medium admission point, at a rate which is calculated to produce certain effects. One of these is the production of a gentle current upwardly and across from the admission point, the angle between the horizontal and diagonal components of which (partly because of the shallowness of the separating zone), is so pronouncedly small that with the progressive decrease of the current from the admission to the discharge end the current at the latter end becomes practically imperceptible. Substantially, therefore, this current is localised at the medium admission end of the separator and at the discharge end there is an absence of disturbing currents so that particles of marginal density will fall quite freely. Nevertheless, at the other end of the separator particles of greater density differential will fall readily against the gentle upward currents which are there present.

Medium is also removed from the bottom of the body of medium (as over a weir or weirs connected with the elevator) at a gentle rate, which is regulated to produce certain results. One of these is, to preserve substantial stability of the medium used, the minimum rate of removal being calculated with reference to the settling rate of the comminuted solids composing the medium, in a closed container without agitation. Another result of this rate regulation is the provision of a gentle downward current, from the level of medium admission, of a strength just sufficient to draw marginal density particles downward from that level and to prevent "matting" of particles there or thereabout. This may entail an increment of downward current additional to that required to maintain substantial stability.

This total rate may be calculated with reference to the falling velocity of the slowest moving particles of the particular material which is being treated, under free settling conditions, and should start these particles down from the bottom level of the separating zone with a velocity about equal to or approaching that which they would have under free settling conditions.

The invention also, among other features, provides re-separation or second separation of novel character, in the elevator or other body connected with the bottom of the separator. This is particularly for the purpose of refloating any "float" or "near-float" particles which may have been drawn down and which are not desired to appear in the "sink."

In order that the invention may be more clearly understood, attention is directed to the accompanying drawings, which illustrate certain aspects of the invention.

Referring to the drawings.

It will first be noted that certain ores break on crushing in such a manner that a considerable proportion of the sink particles is only sparsely impregnated with the economic mineral, so that the specific gravity of such particles is only slightly greater than that of the gangue. If now the difference between the two specific gravities is only 0.10, for example, it can be shown that this may be caused by considerable amounts of valuable metal which could not be saved, or only with difficulty, by certain prior methods. The present invention is particularly useful for treatment of types of ore in which the density differential as above noted is slight.

The characteristics of a given ore, in reference to its proportions of different densities, etc. may be determined by a special examination, which we shall term "density analysis," by which a sample of mineral or ore is crushed, closed-sized at small intervals, and each size fraction separated by sink and float under static conditions to produce density fractions between close limits within each size range, after which the percentage weights of the density fractions, together with the assay results, over a practical range of sizes, are ascertained. The results of such examinations will indicate the types of ore for which the process presently to be described is particularly useful, and may also be utilized for other purposes hereinafter described.

In the following description, the results of density analyses are given for a number of ores and represent exemplifications of the composition from the sink-and-float separation point of view of typical ores:

*Type A—Ideal sink and float ores*, i. e., ores showing:
 (a) A large percentage of float;
 (b) A small percentage (less than 2–3%) of middlings or marginal density fractions (within the density limits of .08–.10 above the density of the float); and
 (c) A relatively small percentage of sink having a very high average density in comparison with the float.

Figure 1:
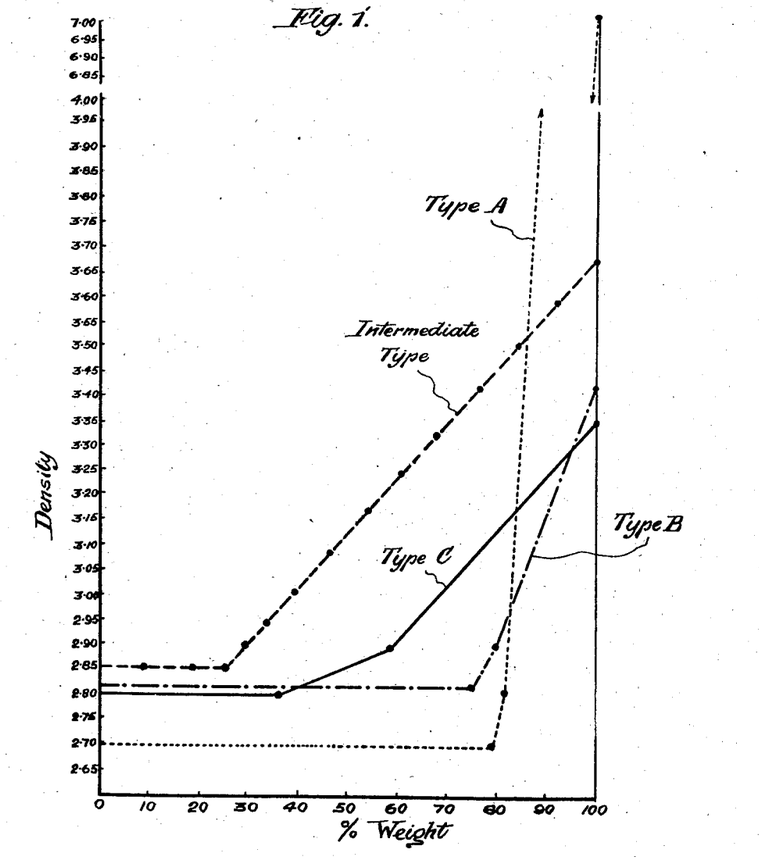
Figure 1 contains graphs showing characteristics of different ores in reference to the content of float, sink and middlings particles, these to be taken with certain examples given in the text.

Graphic presentation of this type of ore is given in Figure 1.

*Type B—Ores amenable to sink and float treatment*, i. e., ores showing:
 (a) A large percentage of float;
 (b) An appreciable percentage (between 3% and 10%) of middlings or marginal density fractions (within the density limits of .08–.10 above the density of the float); and
 (c) A relatively small percentage of sink of an average density of 1.0–2.0 above that of the float.

Graphic presentation of this type of ore is given in Figure 1.

*Type C—Difficult sink and float ores*, i. e., ores showing:
 (a) A relatively small percentage of float.
 (b) A large percentage (more than 10% and approaching the percentage of float) of middlings or marginal density fractions (within the density limits of .08–.10 above the density of the float); and
 (c) A relatively small percentage of sink of an average density of only about 1.0 above that of the float.

Graphic presentation of this type of ore is given in Figure 1.

*Intermediate type*, i. e., ores showing:
 (a) A relatively small percentage of float;
 (b) A percentage intermediate between 10 and 20% of middlings or marginal density fractions (within the density limits of .08–.10 above the density of the float); and
 (c) A relatively large percentage of sink of an average density of more than 1.0 above that of the float.

Graphic presentation of this type of ore is given in Figure 1.

It will be apparent from the above explanation that the selectiveness required for treatment of ores classed under Types B and C cannot be obtained by the use of stratified media, and also that the use of mechanical or equivalent agitating means is to be avoided.

In order to arrive at an understanding of the important difference between ores of Types B and C, the falling velocities of the ore particles under conditions prevailing in sink-and-float separation have to be taken into account. The Stokes and Newton laws governing the free-falling velocity of variously sized particles in media of varying densities not only require adjustment by allowing for the viscosity of the sink-and-float separating medium but, in addition, qualifying corrections are necessary in considering the specific hindered-settlement conditions under which particles have to descend in the media comprising relatively viscous solutions or suspensions of comminuted solids. On sizes exceeding ¼" (6.35 mm.), the falling velocities of the sink particles are, even under hindered settlement, generally speaking, sufficiently high to ensure satisfactory separation at a rate which permits of commercial application, provided the density of the particles is at least 0.1 above that of the gangue. With the lower size ranges, however, and notably with a density differential less than the above figure, the falling velocities become of an order which is insufficient for such application. This conclusion will be seen to be clearly borne out by the examples given in the following table:

| Mineral | Size range, mm. | Sp. gr. of mineral | Density of medium | Difference in density | Viscosity of medium | Falling rate mm. per sec. |
|---|---|---|---|---|---|---|
| (a) Calcite | 3.17 to 1.67 | 2.70 | 2.61 | 0.09 | 1.21 | 18.3 |
|  | 4.76 to 3.17 | 2.70 | 2.61 | 0.09 | 1.21 | 20.9 |
|  | 6.35 to 4.76 | 2.70 | 2.61 | 0.09 | 1.21 | 30.7 |
| (b) Quartz | 3.17 to 1.67 | 2.65 | 2.59 | 0.06 | 1.20 | 8.7 |
|  | 4.76 to 3.17 | 2.65 | 2.59 | 0.06 | 1.20 | 12.8 |
|  | 6.35 to 4.76 | 2.65 | 2.59 | 0.06 | 1.20 | 17.8 |
| (c) Calcite | 3.17 to 1.67 | 2.70 | 2.67 | 0.03 | 1.21 | 8.2 |
|  | 4.76 to 3.17 | 2.70 | 2.67 | 0.03 | 1.21 | 9.3 |
|  | 6.35 to 4.76 | 2.70 | 2.67 | 0.03 | 1.21 | 14.2 |
| (d) Quartz | 3.17 to 1.67 | 2.65 | 2.625 | 0.025 | 1.20 | 3.1 |
|  | 4.76 to 3.17 | 2.65 | 2.625 | 0.025 | 1.20 | 5.2 |
|  | 6.35 to 4.76 | 2.65 | 2.625 | 0.025 | 1.20 | 8.4 |

The above table indicates that consideration must be given to the fact that ores of Type C have to be crushed to much smaller sizes (generally—⅜"), in contrast with ores of Types A and B which often are separated at sizes as large as 1¼", so that in the former case a considerably greater amount of fines is produced. The inclusion of particles finer than ¼" (6.35 mm.) and even ⅛" (3.17 mm.) in the sink-and-float feed is essential for commercial reasons, otherwise the percentage of the run-of-mine ore available for sink-and-float separation will be too small to warrant such treatment. The retardation offered by the viscous resistance of the separating medium naturally increases with decreasing particle sizes and/or increasing viscosity of the medium and these phenomena, together with the inherently low falling velocity of ore particles of marginal density, create a complexity of difficulties which is enhanced when treatment of ores of Type C is contemplated.

It will be seen from the above examples, which were arrived at under actual trial operating conditions, that the falling velocities especially in the size ranges below 4.76 mm. are very modest, so much so in fact that the use of even gentle upward currents would render economic separation of Class C ores extremely difficult, and indeed in most cases if upward currents are used teetering of particles of marginal density will occur, which will upset the separation operation owing to the formation of densely crowded or matted layers which will even impede the sinking of particles of adequate falling velocity. It is considered essential for the practical operation of the process presently to be described that the falling rate of the most slowly moving particle should be well in excess of 3-4 mm. per second.

We have found that, in order to attain the separation with sufficient accuracy of comparatively small particles in ores which contain a considerable percentage of intermediate density fractions, the use of upward currents (except above the medium admission level, as hereinafter explained) should be entirely omitted, and the natural downward movement of particles supplemented by a superposed and accurately controlled downward drag.

Figure 2:
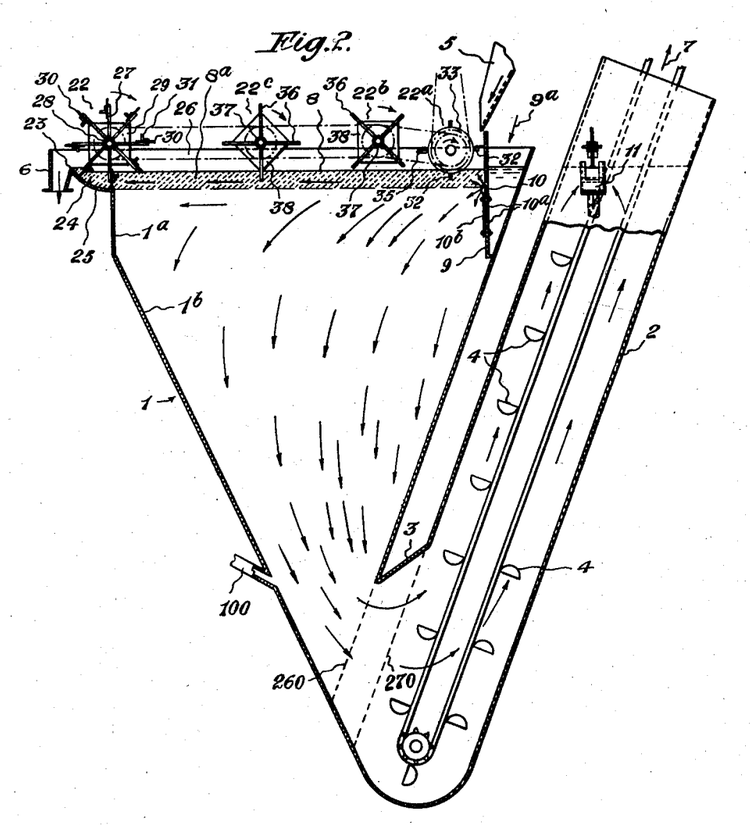
Figure 2 is a diagrammatic vertical section taken through one form of separating apparatus, showing certain features of the invention.

The invention, comprising process and apparatus, will now be described in connection with the accompanying drawings. The separating vessel 1 as shown in Figure 2 is preferably of uniform cross section for a short distance down from the top, as shown at 1ª, below which it inclines inwardly and downwardly, as shown at 1ᵇ, to produce an inverted cone or inverted wedge. In plan the separator may be circular or rectangular. At the bottom it is connected with the sinks elevator casing, 2, so that sink material which passes into casing 2, by passage 3, may be elevated by a bucket or other suitable type of elevator 4. Raw ore or other material to be separated is fed on to the top surface 8, or near the top, of the body of medium in the separator tank through a hopper, such as is indicated at 5, at one end of the tank, while the float material is discharged at the opposite end of the tank, through a hopper 6, over the boom 23. The sink material is discharged from the top of the elevator, as is indicated at 7.

The medium feed (or chief medium feed) for the separator is a short distance below the medium surface level 8, at the top back of the separator, adjacent to the ore feed 5. As indicated by the arrow 9ª, fresh medium, or reclaimed medium, may be fed into a small tank or receptacle, 9, at this point, and is admitted into the separator through a slot, or line of slots, 10, in the back wall of the separator. The level of medium admission is preferably made adjustable in any suitable manner, so that this level will be of the order of from two to six inches below the medium level in the separator, and by way of example further slots or lines of slots are indicated at 10ª and any of the slots except those at a selected level can be covered by a plate or slide valve member such as 10ᵇ. If desired, the number or the area of the slots at any level may also be made adjustable in any suitable manner. The rate of medium admission at any time may be adjusted by any desired means, for example, means operative, as by means of valves, to adjust the area of the cross-section of the pipe through which the medium is supplied to the tank 9 at 9ª.

The shallow separating zone 8ª, at the top of the separator, extends down from the surface 8, of the body of medium, to the level of medium admission through slot 10, this zone being indicated in Figure 2 by cross-hatching. Medium is continuously withdrawn from the top over the boom 23, as stated, and from the top of the medium column in the elevator casing (connected with the bottom of the body of medium in the separator), over a weir or weirs, which, as is indicated at 11 in Figure 2, are made adjustable, so that the height of the weirs and thus the rate of weir discharge may be varied.

The feed medium is admitted to the separator at a gentle, controlled rate, as will be explained and, because of the withdrawal of medium over the boom and over the weir or weirs, divides into two streams, one upwardly towards the surface and across towards the boom, and the other downwardly. Float material, separated in zone 8ª, may be progressed across the surface by any suitable means, as by the paddle-wheel arrangements indicated at 22, 22ª, 22ᵇ, 22ᶜ and discharged over the boom. The rate of medium discharge over the boom may be varied as required, by suitable means. As shown in the drawings, a shallow trough or pocket 24, may be provided, forming an extension of the separator beyond the front wall thereof, and terminating in the boom 23, this pocket having a concave bottom 25, the curvature of which is concentric with the paddle-wheel 22. The blades 27 of paddle-wheel 22 rotate in contact with the curved bottom of trough or pocket 24, and also in contact with the sides thereof which may be continuations of the sides 26 of the separator tank. Blades 27 may be provided with strips 28 of rubber or other suitable material, at the ends thereof, for making close contact with the bottom and sides of trough or pocket 24, so that a measured quantity of medium, together with float material, will be scooped out of the trough or pocket and over the boom by each paddle-wheel blade, at each revolution of the paddle-wheel. The rate of float discharge thereby determined may be varied as required by varying the rate of revolution of paddle-wheel 22, or by varying the level 8 of the medium in the separator (by adjustment of the weir or weirs 11), or by both means. The particular means of regulating the rate of boom discharge here referred to does not constitute part of the present invention, but is the joint invention of the present applicants and William Richard Skelton, as is described in their concurrent application, Serial No. 371,838, filed on even date herewith. In Figure 2 22ᵃ, 22ᵇ and 22ᶜ are additional paddle-wheels also of the nature described in the concurrent application the first being a paddle-wheel for causing immersion of the divided ore materials in the body of medium as they are fed at 5 and the others 22ᵇ and 22ᶜ being principally intended for conveying the float material towards the boom 23. For further description of these paddle-wheels reference is directed to the concurrent application, but it may be mentioned here that their arrangement and operation for carrying out the process of the present invention would be such that they exert no sensibly deleterious interference with the substantially quiescent separating zone, and do not dip so deeply into this zone as to push particles down to the level where the feed medium enters and where the downward currents are adapted to commence. There might be a certain slight disturbance at the immersion paddle-wheel 22ᵃ where this is employed but this would be localised and the separating zone might then be regarded as extending from just forward of this paddle-wheel. Moreover these additional paddle-wheels could be made vertically adjustable to enable their effect to be controlled and in any case for the purposes of this invention they would be revolved only relatively slowly. The paddle-wheel 22ᵃ might also be adapted to disperse the local upward currents at the feed medium entry slot or slots 10, 10ᵃ.

The separating vessel is preferably designed as shown to have a uniform cross section from the top down to about the lowest level of the slot or slots 10, 10ᵃ, or somewhat lower, the tapering portion of the vessel commencing below the level of the slots, so that the downward movement of the sink particles may be accelerated, because of the taper of the vessel, after, but not before, these particles have fallen below the level of medium feed admission at slots 10, 10ᵃ. The level of the medium in the supply tank 9 is preferably kept at a slight distance only above the level 8 of the medium in the separator, so that the medium admission will be under no more than a very slight hydrostatic head.

The total admission of medium to the separator per unit of time must, of course, equal the removal of medium in the same time over the boom and the weir or weirs and removal of medium adhering to the products of separation, the rates of intake and removal over boom and weir or weirs all being adjustable. The rate of flow of the downward current from slots 10 will depend upon the rate at which medium is withdrawn over weir or weirs 11, which may be adjusted by suitable means, as by adjusting the rate of admission while maintaining the rate of medium discharge over the boom at a desired amount, the remainder overflowing at the weir or weirs. The necessary calculations for the rate of weir discharge and therefore the rate of downward current will now be explained.

The process herein described makes use of a medium of a type which may be referred to as substantially stable, without the use of agitation. A medium in which a suspension of solid particles in a liquid must be maintained by mechanical or other agitating or sustaining means cannot be used in this process, because such means would prevent the formation of the desired gentle downward currents. That being understood, a substantially stable medium (when a suspension, as opposed to a heavy liquid or solution, is used), is considered to be one in which the settling rate of the solids, in the absence of agitation or currents, is so slight as not to interfere with operation. For example, if a suspension in a vessel, without agitation or removal of medium, settles at such a rate as to produce 10 mm. height of supernatant clear liquid in eight minutes, that may be considered a substantially stable medium for the present purposes. The stability of different media, which may be used herein will, however, be subject to some variation, and may readily be calculated in each case examples of suitable media, and methods of preparing the same, are contained in patent to Pearson, No. 2,206,574, dated July 2, 1940.

Now, as to the rate of weir discharge and rate of downward current, the minimum strength of this current must be primarily dependent on the stability of the medium used. The use of gentle upward currents, as previously proposed, has undoubtedly the beneficial effect of promoting the stability of a substantially stable medium. We have, however, found that the same effect can be obtained with a downward current, of the character which we wish to use, by removing the medium downwardly from the separator zone at a rate approximately corresponding to the settling rate, under undisturbed conditions, of the comminuted solids of the medium. Thus, for example, a medium having a settling rate of, say, eight minutes, or 480 seconds, for the first 10 mm. height of supernatant liquid, taking the depth of the cone at, say, 600 mm. will have to be removed from below the separating zone at a velocity of only 1.25 mm. per second in order to prevent settling out in the cone to a greater extent than that corresponding to the state of a medium permitted to settle 10 mm. in a glass cylinder.

Considering the substantial stability of the medium which it is preferred to use herein, settlement of the medium in the described manner, by removal of medium over the weir, will produce in the separating vessel a scarcely perceptible density differential from top to bottom. Indeed, as numerous large scale experiments have shown, with control of this character, the density at the bottom of the separator will be only .01 to .02 above the feed density, and this state of balance can conveniently be maintained over any length of operating period. That is to say, in general, the downward current needed to preserve the stability of the suspension within limits sufficient to operate the plant at a negligible density differential between the points of entry and exit of the medium are of such a small order that they do not increase the falling velocity of sink particles emerging below the separating zone by more than approximately 1.0 mm. per second. A downward current of this order, immediately below the slots 10, may, therefore, be considered as the minimum velocity required, and this may be determined more exactly for particular mediums used, either by calculation for the settling rate of the medium under quiet conditions in a container from which no medium is removed, as explained above, or by determining the rate of removal at the weir which will provide a density differential in the separator of the order of .01–.02. Ths minimum current will, of course, be somewhat accelerated by the tapering form of the inverted cone or wedge shaped vessel as the medium flows downwardly therethrough, and such a current velocity can be maintained if there is no need for applying faster currents to give the desired effects. It can readily be increased to accelerate the downward movement of marginal density sink particles which move downwardly too slowly under the force of gravity alone, and any increase in the rate of downward current will decrease the density differential in the separator, to a point where it may be immeasurable by ordinary means.

It should be noted that the above reference to minimum downward velocity of the order of 1 mm. per second for stability of the medium refers to separation in which intermediates having a specific gravity quite close to that of the medium are to be separated. The essential thing is to maintain the density differential in the separator at a figure sufficiently slight so that the density of the medium in the lower part of the separator will still be less than the density of the marginal density particles which are sought to be recovered as "sink." When the difference between the density of the intermediates which are sought to be recovered as "sink" in a particular operation and that of the medium in the upper part of the separator is considerably more than .02, it is not necessary to use so stable a medium as that described above; that is, obviously, the density differential from top to bottom of the separator need not in such a case be held to as small a figure as .02.

Consideration of this possible further increment of downward velocity will be deferred until after a discussion of conditions in the settling zone has been given. The lower limit of this zone is established by the level of medium admission, or thereabouts since, under the operating conditions enforced, no true float particles should get below this level and particles of marginal density, once below this level, will be carried downwardly by the downward current.

The medium admitted through slots 10, will, of course, split into two streams in accordance with the rates of medium discharge over the boom and at the weir or weirs. The stream directed towards the boom, that is, in the direction of the float discharge, may, obviously, be resolved into vertical and horizontal components. Because of the slight depth at which the medium is admitted, at slots 10, a line drawn from the point of entry to the boom would form a very sharp angle with the horizontal, the length of the separating zone from end to end being many times as great as its depth (as, for example, from 48 to 16 times as great). Accordingly, the upward component of this current (which in any case is an exceedingly gentle one) would, theoretically, be small at any point in its travel. In actual practice it is found that there is some upward movement adjacent to the admission end, this becoming progressively less in the movement towards the float discharge end, adjacent to which no upward current is perceptible. It would seem that these slight upward currents are locally dissipated, due to their low velocity, the inherent inertia of the medium and the lack of dispersing baffles at the point of entry, the horizontal movement of float on the surface towards the float discharge also being a possible factor. As to the velocity of the upwardly slanting current described, the boom discharge is usually roughly of the same order as the weir discharge, but while the gallonage which passes over the weir flows downwardly through a cross section which is equal to the separating area of the vessel, the similar gallonage which flows over the boom passes through a much smaller cross section, which is the product of the width of the separator multiplied by a distance which for practical purposes is that from the bottom of the admission slot to the surface of the medium. The velocity upward and across is therefore correspondingly greater than that of the downward current, and will be of the order of 15 to 25 mm. per second, this rate being subject to variation in accordance with the water content of the material treated, as hereinafter described.

The result of the conditions described is a sort of differential separation from end to end of the separator. These large or largest particles of the ore feed which show the most pronounced density differential in respect of the tailings, and therefore the highest falling velocity, will separate and fall at the back end, or admission end, of the separator; they will fall irrespective of such local gently rising currents as there may be at this end, their initial falling velocity being of an order at least ten times that of the counteracting upward currents. As the ore fed on to or slightly below the top of the medium progresses towards the discharge end the effect of the spreading upward currents becomes less, and towards the discharge end their effect in preventing slowly falling particles from reaching the lower level of the separating zone becomes negligible. It is therefore proper to say that particles having the lowest rates of falling velocity will be permitted to fall through at least a portion of the separating zone with the minimum of hindrance. It should be noted that some of these particles, of very slight density differential, would be driven upwardly into the "float" by a very slight upward current, and this commonly takes place in the usual practice in which gentle upward currents are used. And marginal particles which are not actually driven up into the "float" (in a process using upward currents), either because of a slightly greater density differential or because of the extreme weakness of the upward current, fall through the separating zone very slowly, and therefore cause crowding and matting. These difficulties are overcome by the method described herein.

It should further be noted, in this connection, that the admission of medium through slots 10, should take place without pressure, and therefore the hydrostatic head at the slots should be kept as low as possible. This may be accomplished by keeping the level in the supply tank 9, only slightly above that prevailing in the separator tank.

Considerations affecting the depth of the separating zone, i. e., the medium admission level, will now be described. It is desired to keep this zone extremely shallow, for a number of reasons. One reason is the elimination of disturbing upward currents in this zone, as described above. Another reason is the shortening of the time of the separating operation, by shortening the time required for particles to fall under gravity through the separating zone as much as is practical.

These objects can to a considerable extent be realized by following a principle which may be termed the synchronization of the removal of float and the passage through the separating zone of the slowest moving particles contained in the sink. The horizontal movement of the tailings or float across the tank will be at as rapid a rate as the removal of the tailings will permit, generally, allowing, however, sufficient time for the separation of sink and float particles, which time varies with different ores. If, now, the slowest falling particles reach the lower level of the separating zone in the same time which is required for a float particle to travel across the bath to the boom, the result will be to prevent over-crowding of the separating zone, for, the rate of ore feed and of float removal naturally being related, this will mean that each particle falling through the separating zone has reached the medium admission level, (whence it will be drawn downwardly by the downward current provided), before another particle of ore to be separated is deposited on or in the bath vertically above it.

In general, in accordance with present practice, the time required to move a float particle across the surface of the bath is approximately twenty seconds, this referring to a bath which in usual commercial practice is about 8 feet long or slightly longer from end to end. During the same period, taking the falling velocity of the smallest middlings particles through the separating zone at, say, 3 mm. per second, such slowly moving particles will have penetrated 60 mm., or about 2.36 inches. Other considerations apart, the depth of the effective medium feed level would be thereby established, in the example given.

By means of the density analysis described above it can be determined whether there will be in the ore feed in any particular case an appreciable quantity of particles of extremely low falling velocity. It should be noted that the falling velocities calculated from the result of the density analysis will be free falling velocities. The falling velocities through the separating zone will under the specific hindered conditions prevailing therein, be at a less rate, and the relation between these two falling velocities can be determined, more or less closely, by experience. Making the required adjustment of the calculation, the level of admission feed can be adjusted accordingly, the level being raised where the slowest falling particles have a less rate, and lowered, to make a deeper separating zone, where they have a greater falling rate.

Another consideration should, however, be borne in mind, that the sinking particles must descend a sufficient distance, without interference, to ensure proper separation. When the medium entry level is too close to the surface of the minimum the pull of the downward currents will be exerted that much closer to the surface, and may result in dragging down particles which are only slightly heavier than true float, which should in most cases be discarded as float, thus collecting them with the sink, and thereby lowering the ratio of elimination. It is therefore necessary to determine for each individual case the minimum depth of separating zone, and a minimum depth established by the theoretical considerations described above may have to be somewhat increased, by the result of tests. It may however, be said that in general the medium entry level should be at a depth of approximately two to six inches, when ores containing marginal density particles of the character described are being treated.

For establishing the rate of discharge over the boom, it must be borne in mind that the ore feed to the separator contains a varying amount of moisture which, if not continuously removed, will rapidly dilute the bulk of the medium in the separator to a density which will no longer support the float particles. The practice which is common in the prior art of simultaneously feeding the ore and the medium to the surface of the medium in the separator has the disadvantage that the moisture content of the ore is immediately dispersed throughout the medium, and a similar result is observed when the upward current method of medium feed is used. The method of the present invention, on the contrary, permits the dispersal of the moisture derived from the wet ore in a very thin layer on top of the surface of the medium body, which is constantly removed over the boom with the "float" or tailings.

A feature of our invention consists in so regulating the rate of withdrawal of the medium with the tailings discharge that the depth of this supernatant layer will be kept so slight as not to interfere with the separating operation. This rate will therefore vary with the water content of the ore feed, and its regulation may be accomplished by controlling the density of the overflowing medium at the boom, diluted as it is by the water. This result may be obtained by holding the density of this boom discharge to a figure not more than .03 below the medium feed density. Therefore the gallonage withdrawn over the boom may have to be adjusted to obtain and maintain this result. As has been previously stated, the flow over the boom should be a gentle one for various reasons and therefore the rate of withdrawal should not be increased beyond that required for the removal of the water in a thin film, which can be determined by observation.

Again referring to the velocity of the current downwards from the medium admission level the rate of flow must not only maintain stability of the medium but also accelerate the downward movement from that level of particles which should fall as sink, but which would not move downwards, or would move too slowly, under gravity alone. It may be necessary to increase the downward current rate beyond that which is necessary to maintain stability.

The downward current is not intended to aid separation, it only coming substantially into play after the falling marginal density particles have reached the lower level of the separating zone. It is intended (in addition to maintaining stability) to remove downwardly the marginal density particles which otherwise would teeter slightly up and down and form densely crowded layers at about the level of medium admission. Accordingly we impart to such particles a downward velocity sufficient to make up for the hindered conditions of falling, and/or the high viscous resistance of the medium. Therefore the particles having the slowest falling rate are to be given an impetus such that their settling rate shall approximately correspond to or approach their free falling velocity. This usually means, when close separation of marginal particles is desired, that their settling rate from the medium admission level should be in excess of 3 to 4 mm. per second, which rate will be increased as the particles fall further, because of the inverted conical or wedge shape of the vessel.

The adjustment of weir discharge may therefore be made in reference to the free falling velocities of the slowest particles in each case, determined from the density analysis for such case; or, in practice the same general result may be obtained by increasing the current whenever it is observed that marginals are teetering at the bottom of the separating zone, until it is seen that these marginals start to move downwardly. The rate of weir discharge may in extreme cases be considerable, notably if the discard of tailings consisting almost of pure gangue, free from mineral values, is aimed at. The maximum downward velocity should however be limited by the consideration that the current should never be strong enough to drag down an appreciable percentage of true "float" particles into the "sink." The dragging down of "float" can therefore be prevented by decreasing the downward velocity; or it can be prevented by slightly lowering the admission level; or by adjustment of both factors.

A further means and method of regulation will now be described, namely, a re-separation, or further separation of marginal density particles, arranged to take place after these particles have been carried out of the cone by the downwardly accelerated current. This re-separation is particularly desirable when extremely difficult ores are to be treated, that is ores where the feed consists of a large percentage of small particles having only a slightly higher density than the float, when some particles of density very close to that of the medium, which should go into the "float," are likely to be drawn down by the downward current.

One method by which this re-separation may be accomplished is illustrated in Figure 2. As there shown, the bottom of the tapering portion of the separator proper is connected with the elevator casing 2, by a duct or passage 3, the walls of which are widely divergent, to increase the cross-section of this duct, (or expansion chamber), rapidly and considerably. Thus, the cross-sectional area of this duct may increase, from its entrance, indicated at 26⁰, to its exit into the elevator casing, indicated at 27⁰, by about 100 per cent, the area of the opening at 27⁰ approaching to 50 per cent of that of the separating zone proper, indicated at 8ᵃ. It will be noted that the inclination of the sides of the inverted conical or wedge-shaped portion of the separator vessel, and the height of such portion, below the level of medium admission, are both sufficiently great (as is common practice) so that the cross sectional area of the opening through which the medium leaves the separator is no more than one fifth the area of the vessel at the level of medium admission; and this is also true in respect of the modified reseparating construction illustrated in Fig. 3, presently to be described.

The expanded cross section thus provided will, of course, result in decreased velocity of the stream and this, at a point where the downward current in the separator is changed into an upward current in the elevator casing, has the effect of releasing particles of marginal density. That is to say, the duct 3 provides a zone of markedly increased cross-section and thus forms an intermediate pool of more quiescent medium at the point of changing current direction. Further, under the conditions which have been described, the medium in the duct 3 may have a slightly greater density, (of the order of .01 to .02), than the medium in the zone in which primary separation took place. The result will be a further separation as desired of additional float material, over the weir or weirs 11 (this being referred to as "weir-float"), and therefore a more selective collection of "sink," which is caught by the buckets of the elevator.

Other parts shown in Figure 2 are similar to parts described in the concurrent specification and reference is directed to that specification for further information, the additional reference numerals of the concurrent application being inserted in the present drawings for convenience.

Figure 3:
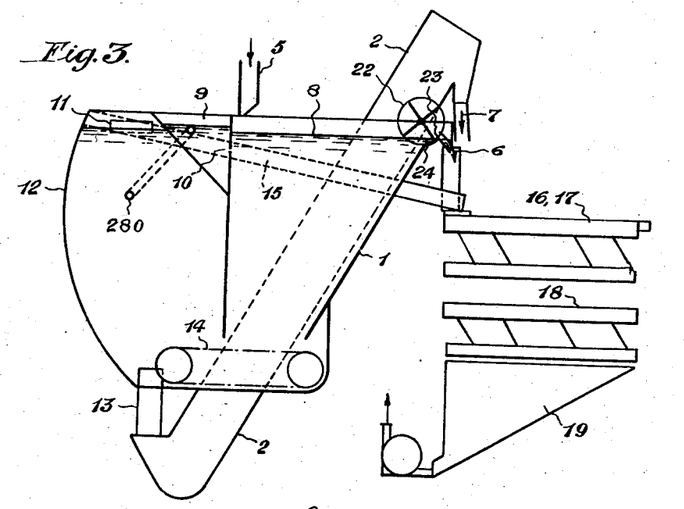
Figure 3 is a similar view taken through modified apparatus.
Figure 4:
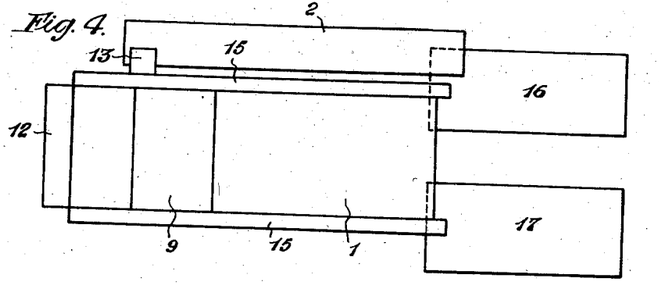
Figure 4 is a plan view of the apparatus shown in Figure 3.

A modified arrangement is shown in Figures 3 and 4. As there shown, the separating vessel 1 is associated with a re-treatment or re-separating pool provided in a second vessel 12 which is separate from the elevator casing 2 and widens upwardly from the bottom, where it has communication with the lower end of the separating vessel, and at its widest part is of only slightly less cross-sectional area than the separating zone in the vessel 1. There is connection from the bottom of this vessel 12 to the bottom of the elevator casing 2 by a duct 13 and sink material is fed to the elevator casing through this duct by a travelling apron or equivalent device 14 on to which the sink settles through the open bottom of the separating vessel 1. It will be seen from Figure 3 that the apron 14 traverses the sink material along the bottom of the re-treatment vessel 12 before it is discharged into the duct 13, so that any float material in the sink will be released in the re-treatment vessel. The latter may narrow towards the upper end so as to facilitate discharge of this float material over weirs 11 into launders 15, the sloping rear wall of the feed-medium tank 9 assisting in this narrowing of the vessel 12. The sink and float materials are discharged on to respective washing screens 16 and 17. The medium from these screens discharges to a medium screen 18 covered with fine mesh through which the medium is delivered to a sump or stock tank 19.

It should be noted that a re-separating zone of such an increased cross section as has just been described will be particularly advantageous in cases where it is required to remove a large percentage of marginal material and where, therefore, the medium admission level is adjusted to be close to the medium level in the separator. In such cases, therefore, a comparatively large percentage of particles is likely to require re-separation.

Finally, it may be noted, various further elements of control, useful in special cases, may be introduced into the system, in harmony with the principles which have been explained. Thus, in some cases it may be desirable to provide accelerated removal of float material at the weir or weirs 11, after secondary separation has taken place. This may be provided by a secondary medium feed to the re-separating zone, as, for example, by injecting medium from the medium tank 8, (shown in Figure 3), to the re-treatment vessel 12, at a point above the largest cross-section thereof, as is indicated at 280.

A further modification of the process and apparatus may consist in the provision of means for adjusting or modifying the density of the medium at the zone in which re-separation takes place. Thus, in the description heretofore given, the re-separation of marginal density particles has been assumed to take place at a medium density slightly above that prevailing in the primary separating zone, the slight increased density resulting in the floating of some particles which otherwise would go into the "sink." If, therefore, it is desired to remove particles as weir-float only up to a specific gravity slightly less than that in the previous case, this can be accomplished by decreasing the specific gravity of the medium in the re-separating zone as required. For example, diluted medium may be introduced into the bottom of the separator, at or near the point where the medium stream leaves the separator and enters the expansion chambers (3, in Figure 2 or 12, in Figure 3), at a rate sufficient to reduce the specific gravity at this point as required. Thus, for example, a controlled volume of the medium discharged with the "float" and subsequently separated from the latter by screens, which has a slightly less density than that of the medium admitted to the separator through slots 16, may be introduced into the lower part of the separator, in amount chosen to compensate as completely as possible for the slight increase in density of the medium from the admission level to the bottom of the separator. A suitable point of introduction of such medium is shown, for example, at 100 in Figure 2.

Such an arrangement, if used, will supplement the means previously described for eliminating to a further extent any possible minor density differential between the top and the bottom of the separator. Obviously, also, the admission of dilute medium at selected levels of the separator below the separating zone may be arranged for, if desired, apart from and independently of any re-separation practice, as a means for controlling the stability of the medium, in addition to the control afforded by the gentle downward current, thus completely avoiding stratification within variations hardly ascertainable under practical operating conditions. Obviously also, if desired, medium of increased or equal (instead of decreased) density can be introduced at the bottom of the separator, if required for any particular re-separation problem, and other variations of detail, within the spirit of the principles and methods described, will be apparent, if required.

It will be apparent from the above description that the separation of marginal density particles is primarily effected in the shallow upper separating zone of the separator under conditions affording the least possible hindrance to their fall; that their removal from the lower layer of this zone, and conveyance out of the separator vessel, is effected by controlled downward currents, and that re-separation, if required, takes place outside the separator at the point where the downward currents are turned upward, in a zone which has a markedly increased cross-section and thus forms an intermediate pool of more quiescent medium. The quantity of medium circulating through the separating vessel should preferably be kept at a minimum rate to save pumping costs and undue attrition of the solids, and thus the strength of the upward and downward currents should preferably be kept at the lowest possible figure.

Figure 5:
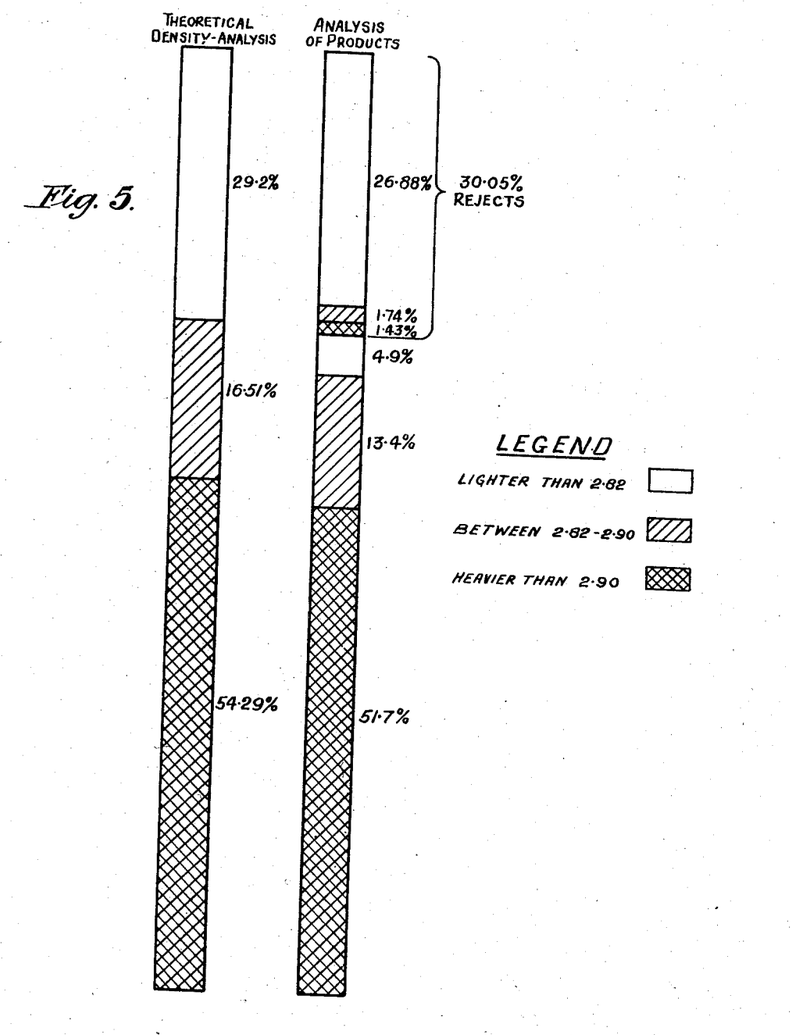
Figure 5 shows diagrams illustrating the accuracy of the separation achievable by the present invention.

By way of example, and as indicating the accuracy of separation obtainable by the present invention, reference is made to the diagrams shown in Figure 5 which indicate results obtained by the invention under actual operating conditions with the ore of which the density analysis is referred to above. These diagrams are self-explanatory but it may be mentioned, for reference, that they reveal, inter alia, that:

(a) Approximately 92% of the total available float material has been isolated as rejects, (b) The rejects contain 90% of true tailings which would float in a static medium at the operating density, and (c) The rejects contain only 10% of the total middlings and 2.5% of the total sink material contained in the ore as shown by the density analysis.

We claim:

1. The process of separating solid materials of different specific gravities according to the sink-and-float method, which comprises, continuously admitting medium to a body of substantially stable separating medium comprising a suspension of comminuted solids in a liquid, which fills a separating vessel, at one end thereof at a level situated a distance of the order of 2 to 6 inches below the surface thereof, continuously feeding material to be separated to the top region of said body, above the level of medium admission, continuously removing medium from the top of said body at the end thereof opposite to the point of medium admission and from the bottom thereof, to produce a current proceeding upwardly and across the body from the point of admission, and a downwardly extending current from the level of admission, regulating the rates of such medium removal to give the downward current a minimum velocity of the order of one millimetre per second, and to give the upwardly inclined current a gentle flow of the order of 15 to 25 mm. per second, the vertical component of which is substantially nil adjacent to the end at which the upper removal of medium takes place, and removing "sink" particles from the bottom, and "float" particles from the top of said body.

2. In a process of separating solid materials of different specific gravities by a substantially stable separating medium, in which material to be separated is fed to the top region of the body of medium above the medium admission level hereinafter mentioned, the steps of providing a separating zone at the top of said body, a conveying current below such zone, and a secondary separating zone, by admitting medium below the top of said body, withdrawing medium from the bottom of said body continuously to produce a downward gentle current and then directing the same upwardly and enlarging the cross-section of the flowing medium sharply and considerably at or immediately after the point at which its direction is changed to produce a zone through which the current flows with less velocity, and adjusting the specific gravity of the medium at said point of enlarged cross-section by continuously introducing at or adjacent to said point a stream of additional medium having a specific gravity less than that of the feed medium.

3. Apparatus for separating solid materials of different specific gravities, comprising, a separator vessel having means for introducing material to be separated to the top region of separating medium therein, at one end thereof, means for withdrawing medium and "float" particles from the top of the medium at the opposite end of said vessel, means for introducing medium into said vessel below the surface of the medium therein substantially without pressure situated at a distance of about two to six inches below the top of the medium, as established by the discharge level thereof, means for withdrawing "sink" particles from the lower end of the vessel, and means for withdrawing medium continuously from the bottom of said vessel, said top and bottom medium withdrawal means constituting the only means for withdrawing medium from said vessel.

4. Apparatus for separating solid materials of different specific gravities, comprising a separator vessel the lower portion of which is of inverted conical or wedge shape, having means for withdrawing medium and "float" particles from the top thereof, means for introducing medium into the vessel a short distance below the level of top medium discharge, a casing outside said vessel communicating with the bottom thereof and extending upwardly, and means for continuously withdrawing medium from the upper part of said casing, establishing a current downwardly in said vessel and then upwardly in said casing, the lower part of said vessel and said casing constituting a continuous conduit for flowing medium with a change of direction adjacent to the bottom of said vessel, the cross-sectional area of which is expanded sharply from the plane through which the medium leaves the separator vessel up to a maximum area equal at least to 40 per cent of the cross-sectional area of said vessel at the level of medium admission, the angle of inclination of the sides of the said inverted conical or wedge-shaped portion of said vessel from the vertical, and the height of such portion below the level of medium admission, both being sufficiently great so that the cross-sectional area of said plane through which the medium leaves said vessel is no more than one-fifth the cross-sectional area of said vessel at the level of medium admission.

5. Apparatus for separating solid materials of different specific gravities, comprising a separator vessel the lower part of which is of inverted conical or wedge shape having means for withdrawing medium and "float" particles from the top thereof and means for introducing medium into the vessel a short distance below the level of top medium discharge, a "sinks" elevator, a casing therefor communicating with the bottom of said vessel, and extending upwardly, and means for withdrawing medium from the upper part of said casing, the lateral passage connecting said vessel and casing being formed with widely diverging sides to form a zone of considerably increased cross-sectional area with reference to the adjacent portion of said separator vessel.

6. Apparatus for separating solid materials of different specific gravities, comprising a separator vessel the lower part of which is of inverted conical or wedge shape having means for withdrawing medium and "float" particles from the top thereof and means for introducing medium into the vessel a short distance below the level of top medium discharge, an upwardly extending re-separating vessel adjacent to said separating vessel, connected at its bottom to the bottom of said separating vessel, said re-separating vessel having a cross-sectional area which increases sharply and considerably upwards from its connection with the separating vessel, in reference to the cross-sectional area of the adjacent portion of said separator vessel, for a considerable portion of its height, means for withdrawing medium and secondary "float" from the upper portion of said re-separating vessel, and a "sinks" elevator connected with the lower portion of said separating vessel.

7. In a process of separating solid materials of different specific gravities by a body of a substantially stable separating medium comprising a suspension of comminuted solids in a liquid, contained in a vessel, in which material to be separated is fed thereto and medium is circulated continuously vertically through said vessel, and in which float particles are removed at the top and sink particles including particles of marginal density are removed at the bottom, the steps of maintaining substantial stability of the medium during separation, by regulating the rate of admission and withdrawal of the medium to and from the vertical extreme portions of said vessel so as to establish no more than a slight density differential from top to bottom of said body, and continuously introducing additional medium diluted to have a specific gravity less than that of the feed medium into the lower portion of said body at a rate sufficient to reduce the density in the lower portion of said body to one which is less than that of the marginal density particles which are sought to be recovered as "sink."

8. The process of separating solid materials of different specific gravities according to the sink-and-float method, which comprises continuously feeding medium to a body of substantially stable separating medium which fills a separating vessel, at one part thereof at a level situated a distance of the order of two to six inches below the surface thereof, and continuously removing "float" and medium from the top of the body at a point thereof distant from the point of medium admission to thereby establish a shallow separating zone above the level of medium admission, removing "sink" particles from the bottom and continuously removing medium from the bottom of said body to produce a conveying current downwardly directed from the level of medium admission, and adjusting the level of medium admission in accordance with the falling velocity of slow falling marginal density particles present in the particular material being treated, said level being set at a higher or a lower point in accordance with whether such velocities are lower or higher, to prevent overcrowding of the separating zone and the accumulation of teetering particles at about the lower surface of said zone.

9. In a process of separating solid materials of different specific gravities by a body of substantially stable separating medium which fills a separating vessel, the steps of feeding moist material to be separated onto the top of said body of medium, continuously admitting medium to said body at a level below the top thereof and continuously removing medium, water and "float" particles from the top of said body at a point or points opposite to the points of material and medium feed, and regulating the rate of such medium and water removal to cause the water to be dispersed over the surface of the medium as a thin supernatant layer and to produce a gentle current flowing in upwardly inclined direction between the medium admission and discharge points, by varying said rate directly in proportion to the water content of the material treated while holding the density of the removed dilute medium to not more than .03 below the density of the medium as admitted.

10. Apparatus for separating solid materials of different specific gravities, comprising a separator vessel having means for withdrawing medium and "float" particles from the top thereof and means for introducing medium into the vessel a short distance below the level of top medium discharge, a re-separating vessel adjacent to said separator vessel, communicating at its bottom with the bottom of said separator vessel, said re-separating vessel having a cross-sectional area which increases sharply and considerably upwards from its connection with said separator vessel, for a considerable portion of its height, means for withdrawing medium from the upper portion of said re-separating vessel, means for conveying "sink" particles from the bottom portion of said separator vessel through the opening into the bottom portion of said re-separating vessel, a "sinks" elevator external to said re-separating vessel, and means for receiving "sink" particles from said "sink" conveying means in the lower portion of said re-separating vessel and delivering the same to said "sinks" elevator.

11. Apparatus for separating solid materials of different specific gravities, comprising, a separator vessel having means for introducing material to be separated to the top region of separating medium therein adjacent to one edge of said vessel, means for withdrawing medium and "float" particles from the top of the medium at a distant edge of said vessel, means for introducing medium into said vessel substantially without pressure below the surface of the medium therein situated at a distance of about two to six inches below the top of the medium, as established by the discharge level thereof, means for withdrawing "sink" particles from the lower end of the vessel, and means for withdrawing medium continuously from the bottom of said vessel, said top and bottom medium withdrawal means constituting the only means for withdrawing medium from said vessel.

12. The process of separating solid materials of different specific gravities according to the sink-and-float method, which comprises, feeding medium gently to a body of substantially stable separating medium comprising a suspension of comminuted solids in a liquid which fills a separating vessel, at one part thereof at a depth below the upper surface thereof of the order of 2 to 6 inches, feeding material to be separated on top of said body, continuously removing "float" particles and medium from the top of said body at a point thereof distant from the point of medium admission, continuously removing medium from the bottom of said body, removing "sink" particles from the bottom of said body, regulating the rate of top medium removal to produce a quiescent zone adjacent the discharge point, having substantially no upward current, through which particles of marginal density may fall to the level of medium admission, and regulating the rate of bottom medium removal to produce a downward current substantially just sufficient to draw downwardly from that level teetering particles of marginal density.

13. The process of separating solid materials of different specific gravities according to the sink-and-float method, which comprises, feeding material to be separated to the top region of a body of substantially stable separating medium comprising a suspension of comminuted solids in a liquid, feeding medium to said body at a depth of the order of 2 to 6 inches below the level of material entrance to said body, withdrawing medium continuously from a portion of the top of said body at a modest rate, withdrawing medium continuously from the bottom of said body at a rate regulated to produce a downward current in said body adapted to draw downwardly teetering particles of marginal density from the level of medium feed, removing "float" particles from the top and "sink" particles from the bottom of said body, causing the stream of medium withdrawn from the bottom of said body to turn laterally and at the same time to expand sharply and considerably in cross-sectional dimension to produce a zone in which the current is decreased, and then to turn upwardly, and removing as "secondary float" from an upper point in said upwardly-turned stream particles of marginal density carried downwardly by said downward current and caused to float upwardly from said expanded zone.

14. The process of separating solid materials of different specific gravities according to the sink-and-float method, which comprises, feeding material to be separated to the top region of a body of substantially stable separating medium comprising a suspension of comminuted solids in a liquid, which fills a separating vessel, admitting medium continuously to said body at one part thereof at a depth below the upper surface thereof of the order of 2 to 6 inches, withdrawing medium continuously from the top of said body at a point thereof distant from the medium feed, withdrawing medium continuously from the bottom of said body at a rate calculated to maintain stability of the body of medium extending downwardly from the level of medium admission and also to produce a downward current of velocity such as to give the slowest falling "sink" particles a downward movement from said level approximately equal to or approaching their free falling rate, and removing "float" particles from the top and "sink" particles from the bottom of said body.

15. The process of separating solid materials of different specific gravities according to the sink-and-float method, which comprises, feeding material to be separated to the top region of a body of substantially stable separating medium comprising a suspension of comminuted solids in a liquid, which fills a separating vessel, continuously admitting medium to said body at one part thereof at a depth of the order of 2 to 6 inches below the level of material entrance to said body, continuously removing medium from the top of said body at a part thereof distant from the part at which medium is admitted, at a rate regulated to prevent the formation of upward currents in a portion of said body above the level of medium feed and thereby to produce a quiescent zone therein, continuously removing medium from the bottom of said body to produce a downward current therein, removing "sink" particles from the bottom and "float" particles from the top of said body, and regulating the rate of said bottom medium removal so as to maintain no more than a slight density differential from the level of medium admission to the bottom of said body with the bottom thereof having a specific gravity of the order of not exceeding .02 more than that of the medium at the level of admission.

16. The process of separating solid materials of different specific gravities according to the sink-and-float method, which comprises, feeding material to be treated to the top region of a body of substantially stable suspension separating medium which fills a separating vessel, continuously admitting medium to said body at a depth of the order of 2 to 6 inches below the level of material entrance to said body the level of medium admission being chosen in reference to the falling velocity of the slowest falling "sink" particles present in appreciable quantity in the particular material being treated and being higher or lower in accordance with whether such velocity is lower or higher, in the case of one or another material treated, continuously removing medium from the top of said body to produce a gentle upwardly directed current and from the level of medium admission, and continuously removing medium from the bottom of said body to produce a gentle current directed downwardly from the level of medium admission, and removing "sink" particles from the bottom and "float" particles from the top of said body.

17. The process of separating solid materials of different specific gravities according to the sink-and-float method which comprises, feeding moist material to be separated to the top of a body of substantially stable separating medium, continuously admitting medium, gently, to said body at one part thereof at a depth of the order of 2 to 6 inches below the upper surface thereof, continuously removing medium, water, and "float" particles from the top of said body at a part thereof distant from the part at which medium is admitted, regulating the rate of such medium and water removal with the water dispersed over the surface of the medium as a thin supernatant layer, and also to produce a gentle current upwardly and across said body from the level of medium admission, by varying such rate directly in proportion to the water content of the material treated, while holding the density of the removed diluted medium to not more than about .03 below the density of the medium as admitted, removing the medium continuously from the bottom of said body to produce a gentle downward current and from the level of medium admission, and removing "sink" particles from the bottom of said body.

18. In a process of separating solid materials of different specific gravities by a substantially stable separating medium comprising a suspension of comminuted solids in a liquid, in which material to be separated is fed to the top region of a body of such medium and in which float particles are removed at the top and sink particles including particles of marginal density are removed at the bottom, and medium is admitted continuously to the upper part of such body and is continuously withdrawn downwardly from the bottom thereof, the steps of maintaining substantial stability of the medium during separation, consisting in regulating the rate of such bottom medium withdrawal so as to establish no more than a slight density differential from the level of medium admission to the bottom of said body, and continuously introducing additional medium having a specific gravity less than that of the medium in the lower portion of said body into the lower portion of the said body at a rate sufficient to reduce the density in the lower portion of said body to one which is less than that of the marginal density particles which are sought to be removed as "sink."

19. In a process of separating substances of different specific gravities by the sink-and-float method, in which material to be separated, including particles of marginal density, is fed to the top portion of a body of separating medium, and in which medium is fed to said body below the entrance level of said material and a quiescent portion is provided in said body above the medium admission level through which marginal density particles may fall, the steps of admitting medium continuously to said body at a level thereof at which a considerable proportion of the separated "sink" particles of marginal density teeter up and down, removing medium continuously from the bottom of said body at a rate sufficient to draw downwardly "sink" particles teetering at said medium admission level, and adjusting said level downwardly if substantial quantities of "float" particles are being drawn downwardly with the "sink."

FREDRICK TROSTLER.
THOMAS ANDREWS.